(12) United States Patent
Tagami

(10) Patent No.: US 7,209,313 B2
(45) Date of Patent: Apr. 24, 2007

(54) METHOD FOR PREVENTING REDUCTION IN A REPRODUCED OUTPUT OF A SERVO SIGNAL IN A MAGNETIC RECORDING MEDIUM

(75) Inventor: Katsumichi Tagami, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/135,510

(22) Filed: May 24, 2005

(65) Prior Publication Data

US 2006/0044670 A1 Mar. 2, 2006

(30) Foreign Application Priority Data

Aug. 30, 2004 (JP) .............................. 2004-250093

(51) Int. Cl.
*G11B 5/596* (2006.01)
*G11B 5/09* (2006.01)
*G11B 5/02* (2006.01)

(52) U.S. Cl. ...................... 360/77.08; 360/51
(58) Field of Classification Search .................. None
See application file for complete search history.

(56) References Cited

U.S. PATENT DOCUMENTS

| 6,429,984 | B1 * | 8/2002 | Alex ............................ 360/31 |
| 6,490,111 | B1 * | 12/2002 | Sacks ........................... 360/75 |
| 6,583,957 | B1 | 6/2003 | Takeshita et al. |
| 6,586,044 | B1 | 7/2003 | Takeshita et al. |

| 2002/0024755 | A1 * | 2/2002 | Kim et al. ..................... 360/55 |
| 2003/0223147 | A1 * | 12/2003 | Nishida et al. ................ 360/48 |
| 2004/0264031 | A1 * | 12/2004 | Yatsu ........................... 360/75 |
| 2005/0157416 | A1 * | 7/2005 | Ehrlich et al. ................. 360/75 |

FOREIGN PATENT DOCUMENTS

| JP | 208770/94 A | 7/1994 |
| JP | H07-287951 A | 10/1995 |
| JP | H10-199172 A | 7/1998 |
| JP | 11-328662 | 11/1999 |
| JP | H11-328662 A | 11/1999 |
| JP | 2000-195042 | 7/2000 |
| JP | 2001-110004 | 4/2001 |
| JP | 2001-216605 A | 8/2001 |
| JP | 2004-110896 A | 4/2004 |

OTHER PUBLICATIONS

"Structure and Application of Hard Disk Devices," p. 72 (May 1, 2002).

* cited by examiner

*Primary Examiner*—K. Wong
(74) *Attorney, Agent, or Firm*—Fitch, Even, Tabin & Flannery

(57) ABSTRACT

Servo regions are re-magnetized in the present invention. A magnetic storage device measures a first amount which is indicative of the magnitude of magnetization of a servo region, by a read head portion. The first amount may be a reproduced output, or an inverse of a gain used in an automatic gain control, etc. Servo regions are re-magnetized by a write head portion, when a servo region is detected in which a ratio of the measured first amount to an initial value of the first amount is smaller than a predetermined value, i.e., it is determined that the magnetization is reduced.

22 Claims, 12 Drawing Sheets

METHOD FOR PREVENTING REDUCTION IN A REPRODUCED OUTPUT OF A SERVO SIGNAL IN A MAGNETIC RECORDING MEDIUM

This Application is an U.S. Nonprovisional Utility Patent Application that claims priority from Japanese Patent Application No. 2004-250093 filed Aug. 30, 2004, the complete disclosure of which is incorporated herein by reference.

BACKGROUND OF THE INVENTION

1. Field of the Invention

The present invention relates to a method for preventing reduction in a reproduced output of a servo signal in a magnetic recording medium, especially in a perpendicular magnetic recording medium in a discrete track disk type.

2. Description of the Related Art

In a magnetic recording medium such as a hard disk, a higher areal density has been achieved by virtue of the increase in linear recording density and track recording density. These recording densities are essential factors to further increase the areal density in the future.

A perpendicular magnetic recording technique has been used to further increase the linear recording density. A perpendicular magnetic recording medium used in this technique can achieve a higher linear recording density due to its ability, for example, to ensure stability against thermal fluctuation of magnetization of a recording medium, as compared with a conventional longitudinal magnetic recording medium which has been widely used.

In this perpendicular magnetic recording technique which can increase the linear recording density as described above, a higher track recording density can be further realized by forming predetermined concave/convex patterns on a perpendicular magnetic recording medium, and by recording data signals and servo signals on the convex patterns. The perpendicular magnetic recording medium used in this technique is called a "discrete track disk type." See, for example, the specifications etc. of Japanese Patent Laid-open Publication No. 328662/99 and 195042/2000, for details.

In the perpendicular magnetic recording medium in this discrete track disk type, since the adjacent magnetic recording tracks on the convex patterns on which data signals are recorded are separated by concave patterns, the data signals are less affected by the adjacent magnetic recording tracks in both read and write processes. This allows an increase in track recording density of the perpendicular magnetic recording medium in the discrete track disk type, compared to a perpendicular magnetic recording medium in a continuous medium disk type.

However, it is known in the art that the increase in the areal density of a magnetic recording medium causes the phenomenon of so-called thermal fluctuation to occur in a greater degree. This phenomenon, which leads to a gradual reduction in magnetization, is caused by stochastic fluctuation in magnetization due to disturbance of thermal energy, and makes it difficult to increase the areal density.

The thermal fluctuation will be described next. As the areal density of a magnetic recording medium is increased, the size of magnetic recording bits becomes smaller in the magnetic recording medium. In order to ensure a high Signal/Noise ratio even with smaller magnetic recording bits, the magnetic recording layer must consist of ferromagnetic grains in more than a specific number. In order to ensure a specific number of ferromagnetic grains, the ferromagnetic grains must be reduced in size. However, if the ferromagnetic grains are reduced in size, the disturbance of thermal energy acts on the recording medium as a disturbance, thereby causing the stochastic fluctuation of the magnetization. Thus, the phenomenon of thermal fluctuation occurs to an even greater degree.

For example, in a longitudinal magnetic recording medium conventionally used in various applications, thermal fluctuation arises in an even greater degree, when the ratio $KuV/k_bT$ is less than about 60. For reference, $KuV/k_bT$ is the ratio of magnetization energy of ferromagnetic grains $KuV$, to thermal energy at an ambient temperature $k_bT$, where $Ku$ is the magnetic anisotropy constant, $V$ is the volume of the ferromagnetic grains, $k_b$ is the Boltzmann's constant, and $T$ is absolute temperature.

In a longitudinal magnetic recording medium, the magnetization is reduced in a greater degree in a higher recording density region due to thermal fluctuation, because the demagnetizing field, which reduces the magnetization, increases in the higher recording density region. Therefore, a data region in which data signals are recorded tends to be affected to a greater degree by the thermal fluctuation than a servo region in which servo signals are recorded, because the data region has a higher recording density and the servo region has a lower recording density. A method for preventing reduction in the magnetization in a data region is proposed in the specification etc. of Japanese Patent Laid-open Publication No. 110004/2001.

On the other hand, in a perpendicular magnetic recording medium, contrary to the longitudinal recording medium, as the recording density is increased, the magnetization becomes more stable, and the medium is less affected by the thermal fluctuation. In other word, as the recording density is lowered, or the bit length is increased, the demagnetizing field which reduces the magnetization is increased. As a result, the medium tends to be affected in a greater degree by the thermal fluctuation, and the magnetization is degraded. Therefore, in a perpendicular magnetic recording medium, it is the servo region, which has a relatively low recording density, that is affected most by the thermal fluctuation.

However, the servo signal is not refreshed again after being recorded once. Since a perpendicular magnetic recording medium is affected in the servo region in a greater degree due to thermal fluctuation, accumulation of the thermal fluctuation in the servo region over a long time may result in worse influence on the tracking performance of a magnetic head.

The thermal fluctuation in the servo region of the perpendicular magnetic recording medium is still more critical in the above-described discrete track disk type, compared to the continuous medium disk type, for the following reason.

Referring to FIG. 1, a servo region in a perpendicular magnetic recording medium in the discrete track disk type is illustrated in a schematic diagram. In a servo region in the perpendicular magnetic recording medium in the discrete track disk type, servo signals are recorded by uniformly magnetizing the medium in one direction perpendicular to the medium surface. As a result, convex patterns in which servo signals are recorded, are uniformly magnetized in either the upward or the downward direction. In FIG. 1, all of the convex patterns are magnetized in the upward direction. The convex patterns in which servo signals are recorded, are separated bit by bit with the concave patterns in the circumferential direction of the disk.

Referring next to FIG. 2, a servo region in a perpendicular magnetic recording medium in the continuous medium disk type is illustrated in a schematic diagram. Unlike the perpendicular magnetic recording medium in the discrete track disk type which is entirely magnetized in one direction, servo signals are recorded bit by bit such that the adjacent bits are magnetized in anti-parallel directions to each other. Further, unlike the perpendicular magnetic recording medium in the discrete track disk type, the bits are not spatially separated from each other in the circumferential direction of the disk in a sector.

Since the perpendicular magnetic recording medium in the discrete track disk type is not magnetized in anti-parallel directions as the perpendicular magnetic recording medium in the continuous medium disk type, the amplitude of a reproduced servo signal is approximately half of the continuous medium disk type. This means that the perpendicular magnetic recording medium in the discrete track disk type, the output amplitude of which is inherently low, is even more affected when the output amplitude is lowered by thermal fluctuation.

Further, unlike the perpendicular magnetic recording medium in the continuous medium disk type, the perpendicular magnetic recording medium in the discrete track disk type tends to be more affected by the demagnetizing field due to the isolated bits, resulting in unstable magnetization. In other words, the perpendicular magnetic recording medium in the discrete track disk type is more susceptible to the influence of thermal fluctuation than the perpendicular magnetic recording medium in the continuous medium disk type.

Thus, there exists a strong need for reducing the influence of thermal fluctuation in the perpendicular magnetic recording medium in the discrete track disk type, than the perpendicular magnetic recording medium in the continuous medium disk type.

SUMMARY OF THE INVENTION

It is an object of the present invention to provide a method for preventing reduction in the reproduced output of a servo signal due to thermal fluctuation in a perpendicular magnetic recording medium in a discrete track disk type, to ensure a stable servo function over a long time.

To achieve this object, servo regions are re-magnetized in the present invention. In one embodiment of the present invention, a magnetic storage device measures a first amount which is indicative of the magnitude of magnetization of a servo region, by a read head portion. The first amount may be a reproduced output, or an inverse of a gain used in an automatic gain control, etc.

Servo regions are re-magnetized by a write head portion, when a servo region is detected in which a ratio of the measured first amount to an initial value of the first amount is smaller than a predetermined value, i.e., it is determined that the magnetization is reduced.

The re-magnetization is performed in the following manner. A servo control is started in order to position the magnetic head at a fixed position in a track width direction, when the magnetic head is positioned at a preceding servo region which precedes and is adjacent to the target servo region. The medium is rotated to move the magnetic head to the target servo region. A magnetic field is then applied to the target region by the write head portion when a first gap is detected, wherein the first gap is located at a leading end of the target servo region in a rotating direction of the medium and defines a boundary between the target servo region and a preceding data region. Application of the magnetic field is stopped, when a second gap is detected, wherein the second gap is located at a trailing end of the target servo region in the rotating direction of the medium and defines a boundary between the target servo region and a following data region.

Since the servo control cannot be performed using a servo region which is just being re-magnetized, the servo control is started in order to position the magnetic head at a fixed position in a track width direction, when the magnetic head is positioned at the preceding servo region which precedes the servo region to be re-magnetized. The servo region is re-magnetized accurately with minimum deviation of the head position in the track width direction. Data signals recorded in data regions will not be accidentally erased, since the magnetic field is shut off on detection of the gap.

As described above, according to the present invention, a stable servo function can be ensured for a long time in a magnetic storage device which employs a perpendicular magnetic recording medium in a discrete track disk type, by detecting the reduction in the reproduced output in the servo region, and by automatically re-magnetizing the servo region.

The above and other objects, features and advantages of the present invention will become apparent from the following description with reference to the accompanying drawings which illustrate examples of the present invention.

DETAILED DESCRIPTION OF THE INVENTION

Figure 1:
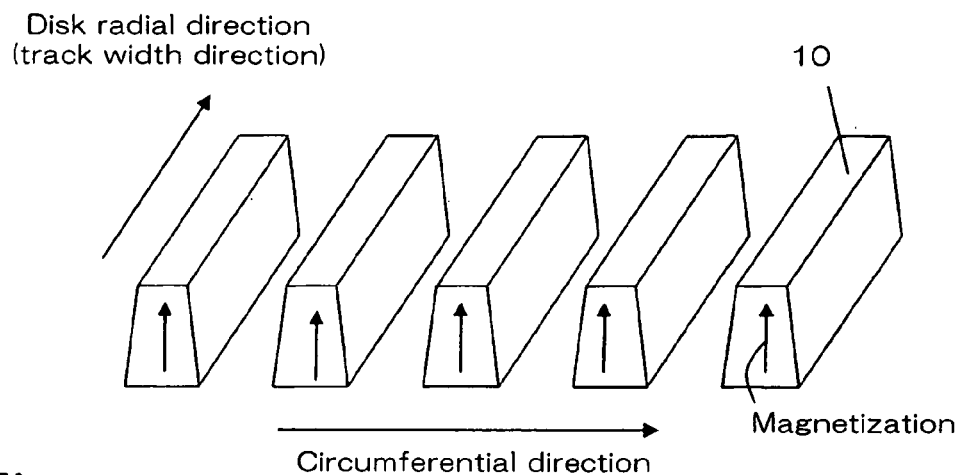
FIG. 1 illustrates a servo region in a perpendicular magnetic recording medium in the discrete track disk type in a schematic diagram.
Figure 2:
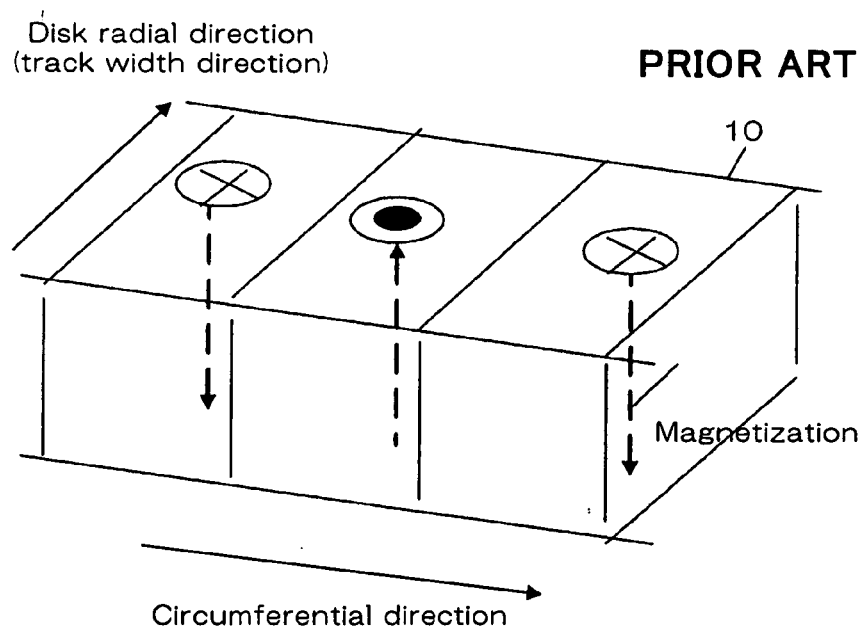
FIG. 2 illustrates a servo region in a perpendicular magnetic recording medium in the continuous medium disk type in a schematic diagram.
Figure 3:
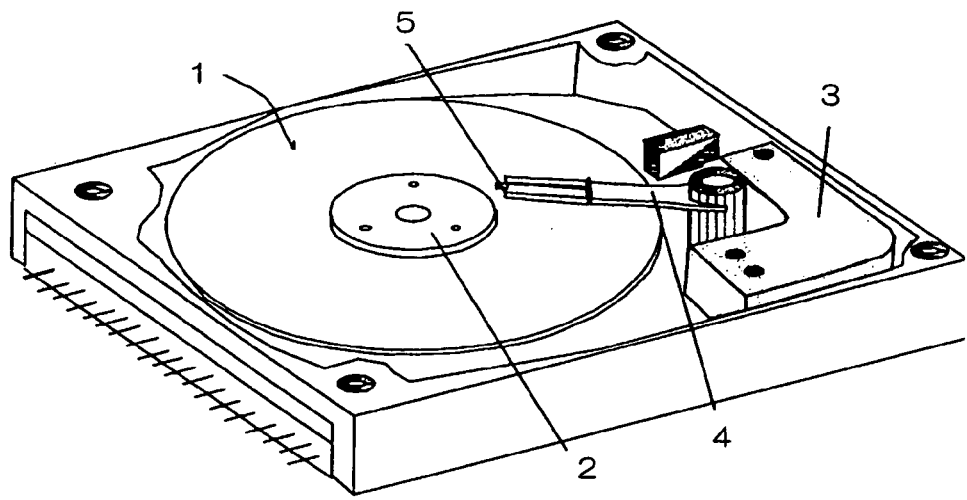
FIG. 3 illustrates a magnetic storage device according to an embodiment of the present invention in a schematic diagram.

Referring to FIG. 3, a magnetic storage device according to an embodiment of the present invention is illustrated in a schematic diagram. Magnetic recording medium 1 employs a discrete track disk type. Magnetic recording medium 1 is rotated by spindle motor 2. Read/write magnetic head 5 is mounted at one end of rotatable arm 4. Voice coil motor 3 rotates rotatable arm 4 based on the servo signal detected by read/write magnetic head 5, to position read/write magnetic head 5 at a predetermined track.

Preferably, a single magnetic pole head in a main pole excitation type is used for the write head portion of read/write magnetic head 5, while a GMR (Giant Magneto-Resistance) head is used for the read head portion. A TMR (Tunneling Magneto-Resistance) head may also be used for the read head portion.

Figure 4:
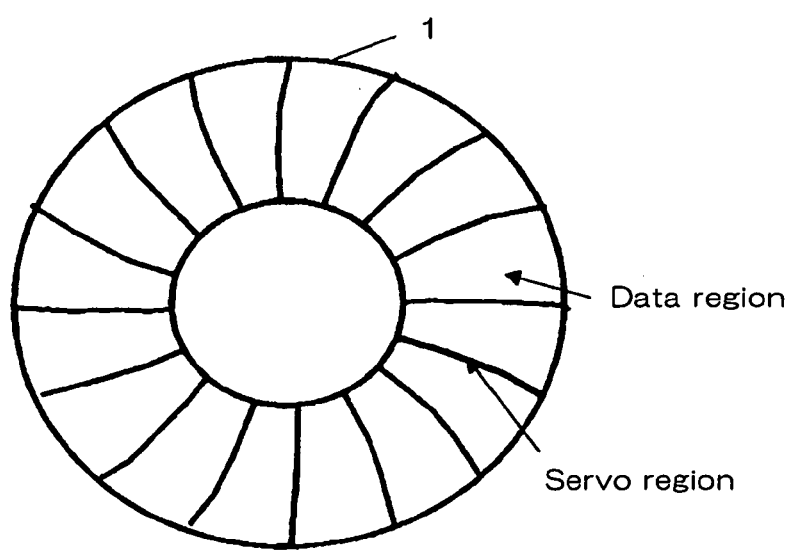
FIG. 4 illustrates a magnetic recording medium in a schematic diagram.

Referring to FIG. 4, a magnetic recording medium is illustrated in a schematic diagram. Magnetic recording medium 1 is partitioned into data regions in which data signals are recorded, and servo regions in which servo signals are recorded. Each of the servo regions is formed in an arcuate shape in order that a rotary actuator detects read/write magnetic head 5. Each of the servo regions defines a sector.

Figure 5:
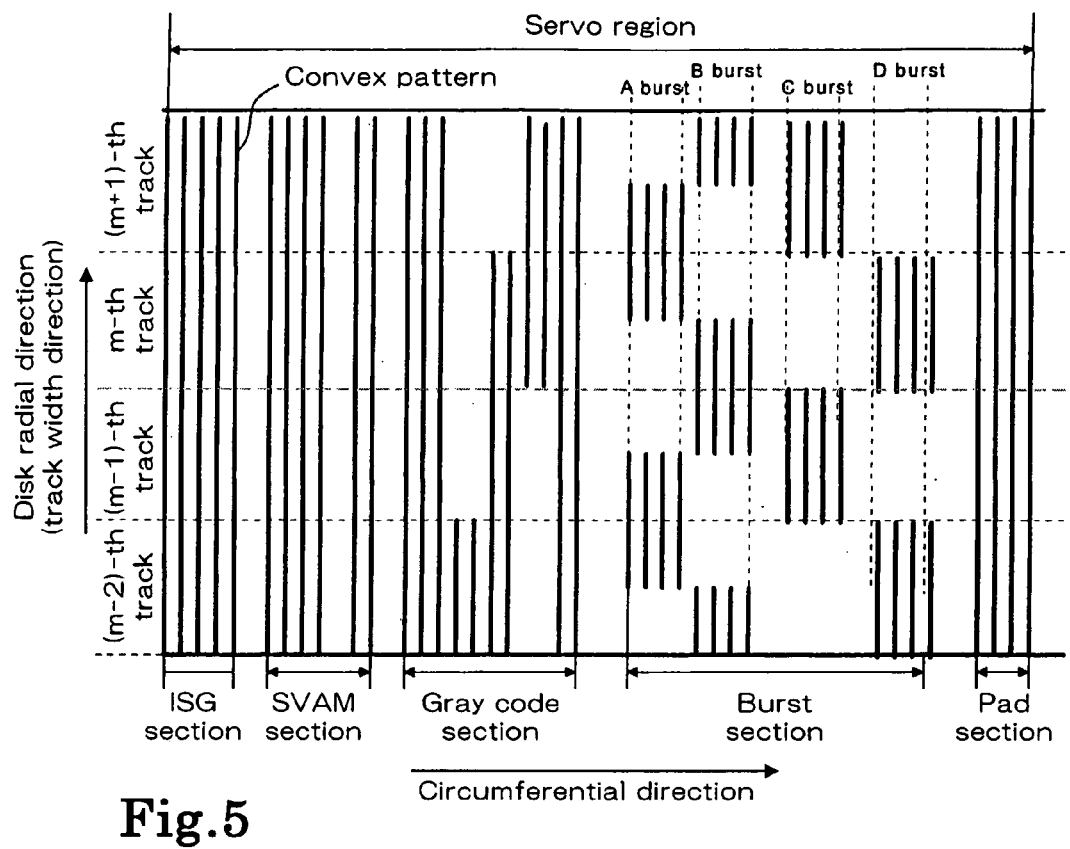
FIG. 5 illustrates a servo region in a schematic diagram.

Referring to FIG. 5, the servo region is illustrated in a schematic diagram. The servo region is composed of an ISG (Initial Signal Gain) section, an SVAM (Servo Address Mark) section, a gray code section, a burst section, and a pad section. In these sections, long convex patterns extend in the radial direction (track width direction) of the disk such that the patterns are arranged by every other bit in the circumferential direction of the disk.

The ISG section is a pattern provided to reduce the influence of variation in the magnetic characteristics of a magnetic film in magnetic recording medium 1, and variation in the spacing gap between recording/reproducing head 5 and the medium surface. When the ISG section is read by read/write magnetic head 5, a servo control circuit calculates a gain for AGC (Auto Gain Control), to compensate for the variations in the reproduced output read by read/write magnetic head 5.

The SVAM section is a pattern to stop the AGC. The AGC is stopped when read/write magnetic head 5 detects the SVAM section.

The gray code section is a pattern in which the information of the track number and the sector number is recorded.

The burst section is a pattern to control the tracking of read/write magnetic head 5 accurately. As an example, the burst section consists of an A-burst and a B-burst arranged symmetrically with respect to the boundary of tracks, and a C-burst and a D-burst arranged symmetrically with respect to the center line of a track. The output amplitude of the burst section is normalized by that of the ISG section.

The pad section is a pattern to compensate for a delay in order to generate the clock signal correctly while the servo region is being read.

The ISG section, the SVAM section, and the pad section are provided continuously in the radial direction (track width direction) of the disk. The gray code section extends through at least several tracks in the radial direction (track width direction) of the disk. The burst section is recorded in one track width in the radial direction (track width direction) of the disk.

Figure 6:
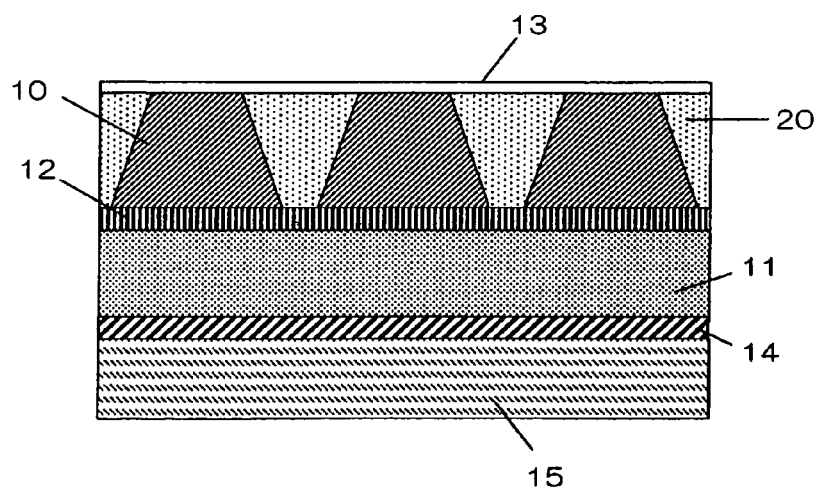
FIG. 6 illustrates a magnetic recording medium in a schematic cross-sectional view.

Referring to FIG. 6, a magnetic recording medium is illustrated in a schematic cross-sectional view. Magnetic recording medium 1 is fabricated by the following process. Crystal orientation layer 14 is formed on mirror-polished glass substrate 15 as an underlying layer which controls the orientation of soft magnetic layer 11. Soft magnetic layer, and intermediate layer 12 which serves as an underlying layer to control the orientation and grain size of perpendicular magnetic recording layer 10, are then deposited. Next, convex perpendicular magnetic recording layer 10 and concave non-magnetic layer 20 are formed on intermediate layer 12 to form a concave-and-convex pattern. Specifically, a perpendicular magnetic recording film is first deposited on intermediate layer 12. A part of the perpendicular magnetic recording film is then etched to create the concave pattern. $SiO_2$ layer is then sputtered to fill the etched convex pattern. The surplus portion of $SiO_2$ layer deposited on perpendicular magnetic recording layer 10 is then removed by the oblique ion beam etching technique with the medium being rotated, and the surface of magnetic recording medium 1 is planarized. Protection film 13 made of a carbon thin film is formed on the surface of perpendicular magnetic recording layer 10 and the surface of non-magnetic layer 20, by a deposition process such as CVD (Chemical Vapor Deposition). Magnetic recording medium 1 illustrated in FIG. 6 is similar to the magnetic recording medium disclosed in the specification etc. of Japanese Patent Laid-open Publication No. 195042/2000.

In one embodiment, perpendicular magnetic recording layer 10 and non-magnetic layer 20 each have a thickness of 13 nm; intermediate layer 12 has a thickness of 15 nm; soft magnetic layer 11 has a thickness of 150 nm; crystal orientation layer has a thickness of 15 nm; and protection film 13 has a thickness of 4 nm. Lubricant, for example fomblin-based lubricant, is coated in an average thickness of 1 nm.

A NiP coated aluminum alloy substrate, or a silicon substrate, or the like may be used instead of glass substrate 15. Crystal orientation layer 14 is preferably made of a ferromagnetic layer made of PtMn in order to apply an anisotropic magnetic field to soft magnetic layer 11 in the radial direction (track width direction) of the disk. However, crystal orientation layer may be made of any suitable non-magnetic alloy layer which can control the orientation. Soft magnetic layer 11 is preferably made of a CoZrNb alloy layer, but may be made of an Fe-based alloy layer, a Co-based amorphous alloy layer, a multilayer film composed of a soft magnetic layer and a non-magnetic layer, a soft magnetic ferrite layer, or the like. Intermediate layer 12 is preferably made of a non-magnetic alloy layer made of CoTi, which controls the perpendicular magnetic anisotropy of perpendicular magnetic recording layer 10, but may be made of a non-magnetic metal layer, an alloy layer, or an alloy layer having a low magnetic permeability. Perpendicular magnetic recording layer 10 is preferably made of an oxide-based material layer such as $SiO_2$ blended with ferromagnetic grains such as CoPt in a matrix arrangement. Perpendicular magnetic recording layer 10 may also be made of a CoCrPt-based alloy layer, an FePt-based alloy layer, a CoPt/Pd-based artificial lattice multilayer alloy layer or the like. Non-magnetic layer 20 in the concave pattern is preferably made of $SiO_2$, but may be made of a non-magnetic oxide layer such as $Al_2O_3$, $TiO_2$, ferrite, a nitride layer such as AlN, or a carbide layer such as SiC.

The magnetic characteristics of perpendicular magnetic recording layer 10 formed in this manner were measured by a vibrating sample magnetometer. According to one example, the saturation magnetization was 350 emu/cc, the residual saturation magnetization was 340 emu/cc, and the coercive force was 3500 Oe.

Next, perpendicular magnetic recording layer 10 in a convex pattern in the servo regions was uniformly magnetized to record servo signals by an electromagnet which was capable of generating a direct current magnetic field of 15 kOe with the pole face thereof positioned in parallel with the surface of magnetic recording medium 1.

According to one example, the track width of the GMR head was 85 nm, and the recording density of the servo signals was set to 130 kFRPI (Flux Reversal per Inch). The relation between the reproduced output of the ISG section in the servo region and the time after magnetization was measured in order to investigate the time-dependent characteristics of the servo signals in the magnetized magnetic recording medium 1.

Figure 7:
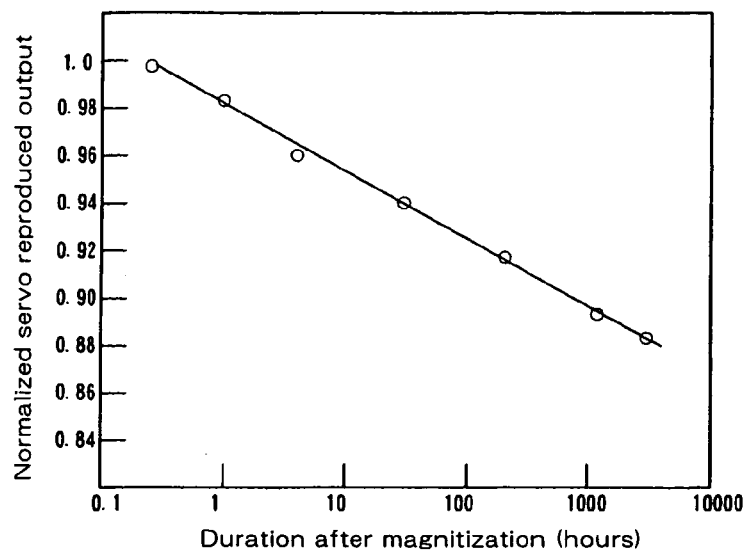
FIG. 7 is a graph showing a change in the reproduced output of the ISG section in the servo region after the magnetization.

Referring to FIG. 7, the graph shows a change in the reproduced output of the ISG section in the servo region after magnetization. The reproduced output was reduced to less than 90% after several months. Since the bits are arranged in low density and isolated from each other in the servo region of the perpendicular magnetic recording medium in the discrete track disk type, the bits are more susceptible to the demagnetizing field. Thus, the magnetization tends to be degraded by the thermal fluctuation, and the reproduced output is significantly reduced. Generally, reduction in the reproduced output of a magnetic recording medium is allowed within 10%. Therefore, it is preferable, from the viewpoint of the reliability of a magnetic storage device, that the recording medium is re-magnetized in the device when a reduction in magnetization is detected through periodic measurement of the reproduced output in the servo region.

Figure 8:
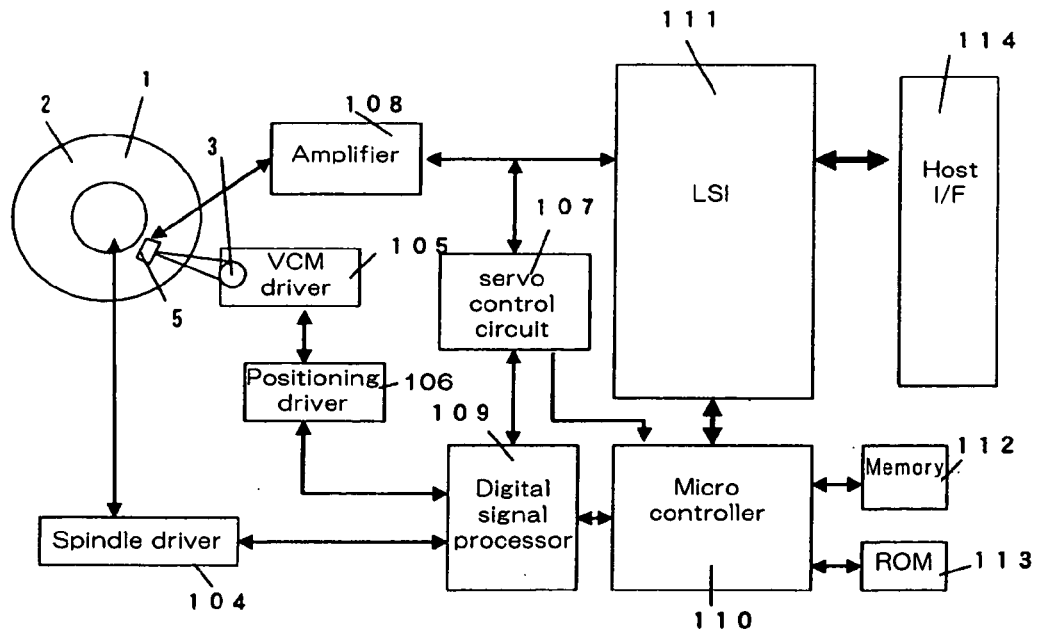
FIG. 8 illustrates a magnetic storage device in a functional block diagram.

Referring to FIG. 8, a magnetic storage device which includes a driving system and a control system is illustrated in a functional block diagram. A data signal recorded in magnetic recording medium 1 is read by read/write magnetic head 5, amplified by amplifier 108, and processed by LSI 111 into a digital signal, which is then transferred to a host computer via host interface 114. A servo signal recorded in magnetic recording medium 1 is read by read/write magnetic head 5, amplified by amplifier 108, processed by servo control circuit 107 and digital signal processor 109. The processed servo signal is applied, via positioning driver 106, to voice coil motor driving circuit 105 to position read/write magnetic head 5. Spindle motor 2 is controlled by the synchronization of spindle driver 104 with the clock of digital signal processor 109. The re-magnetization of the servo regions is controlled by microcontroller 110. A program to control re-magnetization is stored in ROM (Read Only Memory) 113. The output values of the servo signals when and after the medium is magnetized are stored in non-volatile memory 112.

Figure 9:
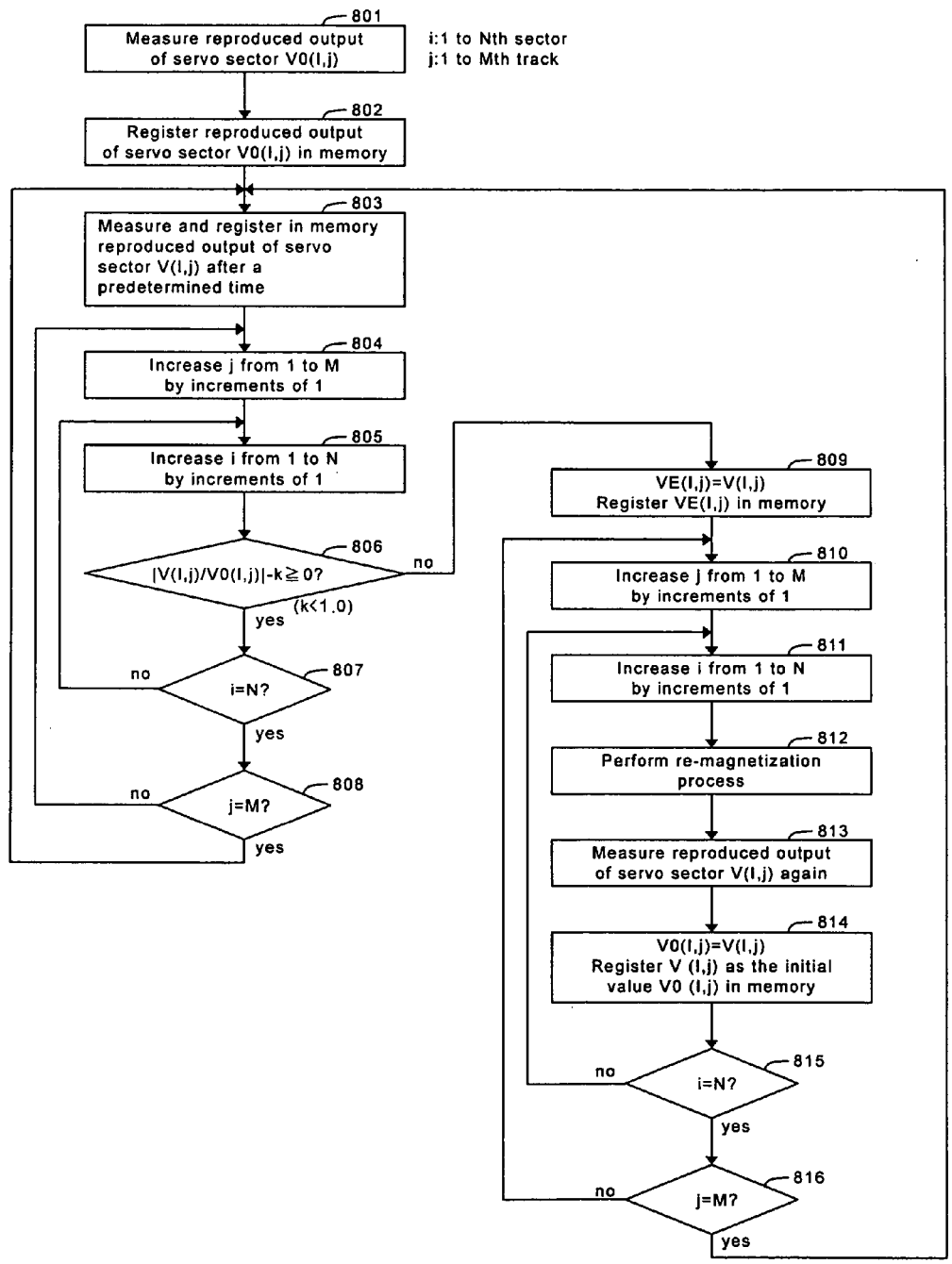
FIG. 9 illustrates a flow chart illustrating a procedure of the re-magnetization of the servo regions which is performed by microcontroller.

Referring to FIG. 9, a flow chart illustrates a procedure of the re-magnetization of the servo regions which is performed by microcontroller 110. First, the servo regions of magnetic recording medium 1 are magnetized with a direct current magnetic field, and magnetic recording medium 1 is loaded in a magnetic storage device. After performing a sector check, the reproduced output of the servo regions are measured at step 801. $V0(i,j)$ represents an average value of the reproduced output of the ISG section in sector i (i=1–N) on track j (j=1–M) after the medium is magnetized with the direct current magnetic field.

Next, at step 802, $V0(i,j)$ is registered in non-volatile memory 112 as an initial value which is used as a reference for detecting a change in the reproduced output after the medium is magnetized.

Next, at step 803, the average reproduced output $V(i,j)$ of the servo region is measured when a predetermined time has passed since step 801 was performed, for example after three months, and is registered in non-volatile memory 112.

Then, at steps 804 through 808, when the absolute value $|V(i,j)/V0(i,j)|$ is equal to or greater than a predetermined value k (hereinafter called "predetermined attenuation factor k") for all tracks (j=1–M) and all sectors (i=1–N), the procedure returns to step 803, because all the reproduced outputs are within an allowable range. If, however, the absolute value $|V(i,j)/V0(i,j)|$ is less than predetermined attenuation factor k for any servo region, the procedure goes to step 809, because the magnetization has been attenuated below the allowable range.

Predetermined attenuation factor k is preferably about 0.9, but is not limited to 0.9, and may be in the range of 0.85–0.95, because predetermined attenuation factor k also depends on the S/N ratio of a device.

At step 809, $V(i,j)$ is saved in non-volatile memory 112 as $VE(i,j)$ to record the location of the attenuated region.

At step 812, the re-magnetization process starts at the appropriate time when only a small load is placed on the CPU. After the re-magnetization is performed, reproduced output $V(i,j)$ is measured again in the re-magnetized servo region at step 813. At step 814, the measured value is replaced for initial value $V0(i,j)$, and is registered in non-volatile memory 112. Steps 812 to 814 are performed for all i and j (steps 810, 811, 815, 816). The procedure then returns to step 803.

Although, in the foregoing procedure, the regions in all the sectors i and all the tracks j are designated, only a part of the sectors and tracks may be designated. Similarly, although the regions in all the sectors i and all the tracks j are re-magnetized in the foregoing procedure, if any one of the servo regions is found to be reduced in reproduced output, all the servo regions need not necessarily be re-magnetized. For example, only the servo region which exhibits a reduction in magnetization may be re-magnetized, or only servo regions near the servo region which exhibits a reduction in magnetization may be re-magnetized. Further, the output of other sections in the servo region, i.e. the SVAM section, the gray code section, the burst section, or the pad section, may be measured instead of the ISG section.

Figure 10:
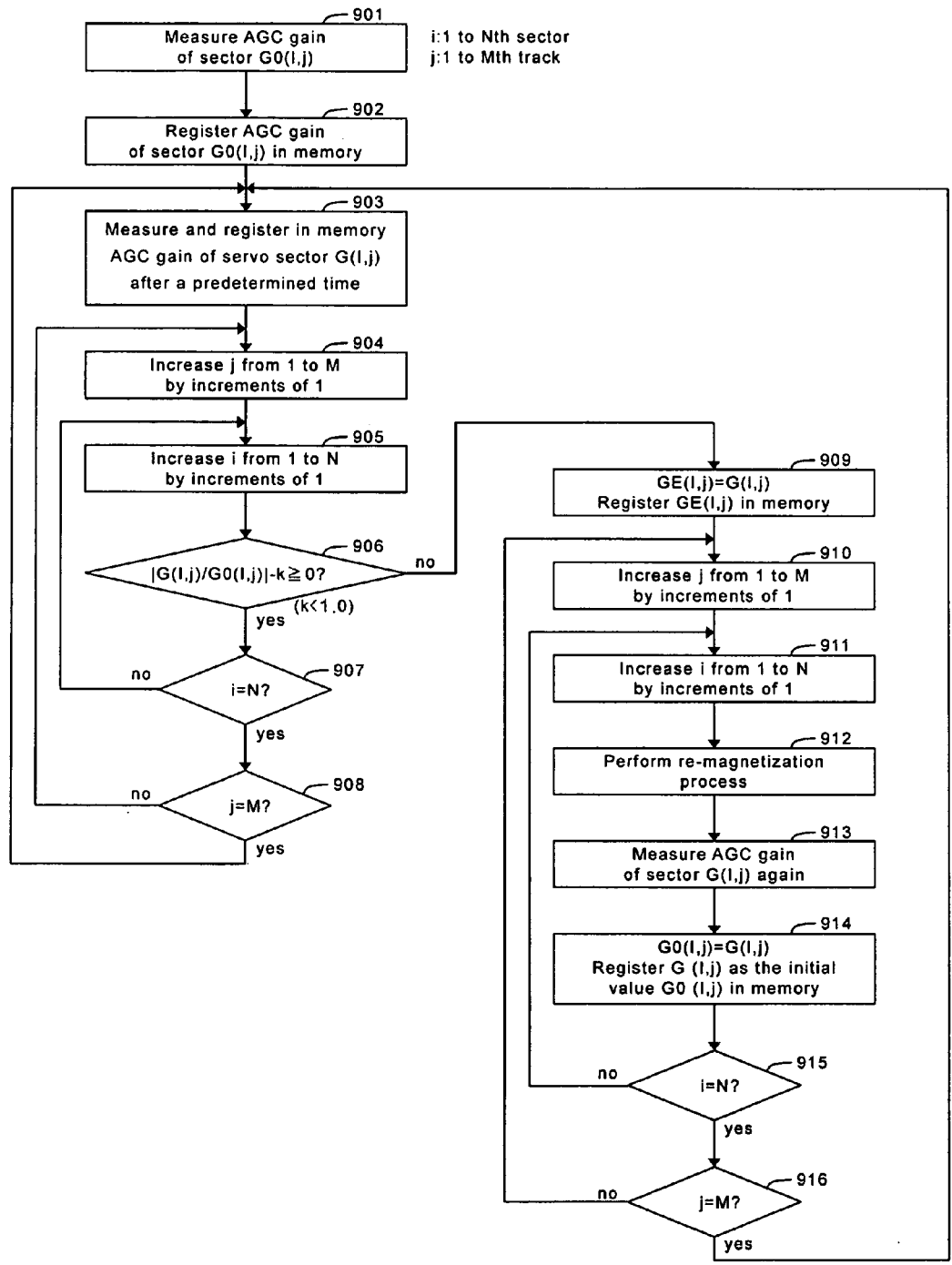
FIG. 10 illustrates a flow chart illustrating another procedure of the re-magnetization of the servo regions which is performed by microcontroller.

Referring to FIG. 10, a flow chart illustrates another procedure of the re-magnetization of the servo regions which is performed by microcontroller 110. Specifically, the procedure illustrated in FIG. 10 uses an inverse of the gain which is used for the AGC in servo control circuit 107, instead of the reproduced output of the servo regions, wherein the AGC is performed when read/write magnetic head 5 reads the ISG section of the servo region.

As described above, the ISG section is a pattern provided to reduce the influence of variation in the magnetic characteristics of a magnetic film of magnetic recording medium 1, and the influence of variation in the spacing gap between recording/reproducing head 5 and the medium surface. The gain is calculated for the AGC in servo control circuit 107, while read/write magnetic head 5 reads the ISG section, to correct the variation in the reproduced output of read/write magnetic head 5. The reproduced output of the ISG section is set at a fixed value by using the gain in order to normalize the reproduced output of the burst pattern section used in tracking. The gain becomes larger as the magnetization of the servo region is degraded. Therefore, the inverse value of the gain, like the reproduced output, can be used as an index to represent the magnitude of the magnetization.

The procedure illustrated in FIG. 10 is the same as that illustrated in FIG. 9, except that inverse 1/G of the AGC gain is used instead of reproduced output V. Steps 901–916 in FIG. 10 correspond to steps 801–816 in FIG. 9, respectively.

Figure 11:
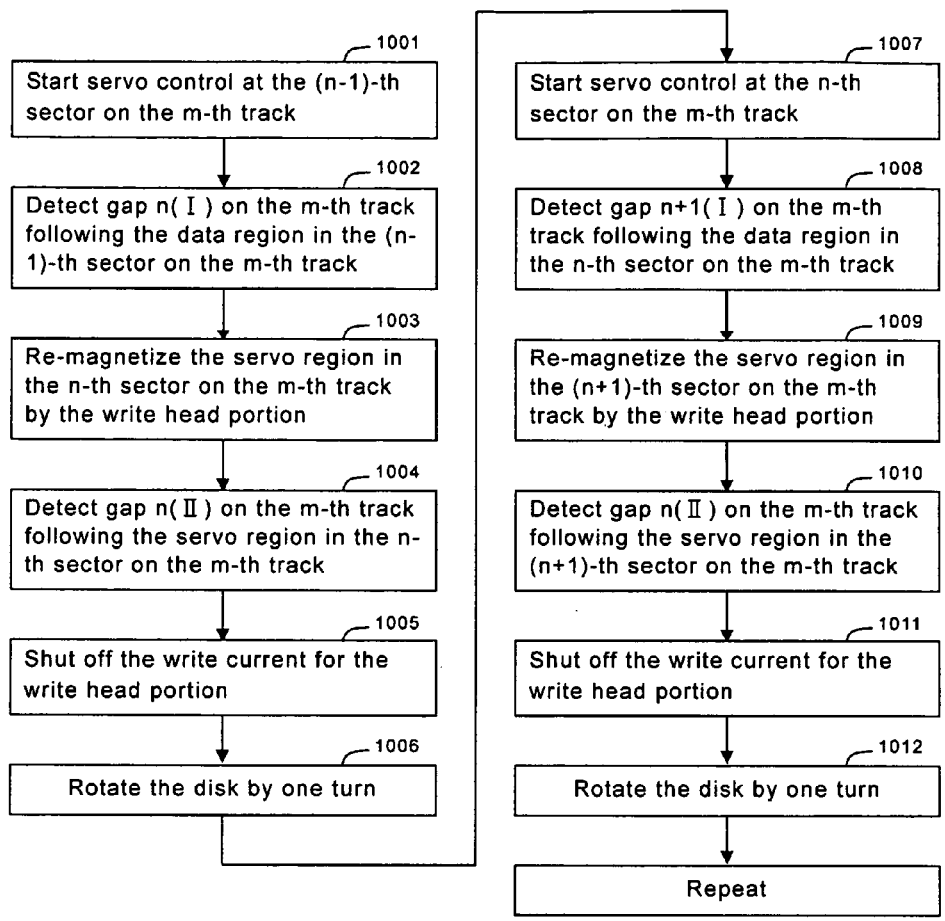
FIG. 11 illustrates a flow chart illustrating a procedure of the re-magnetization at step 812 or 912 in greater detail.
Figure 12:
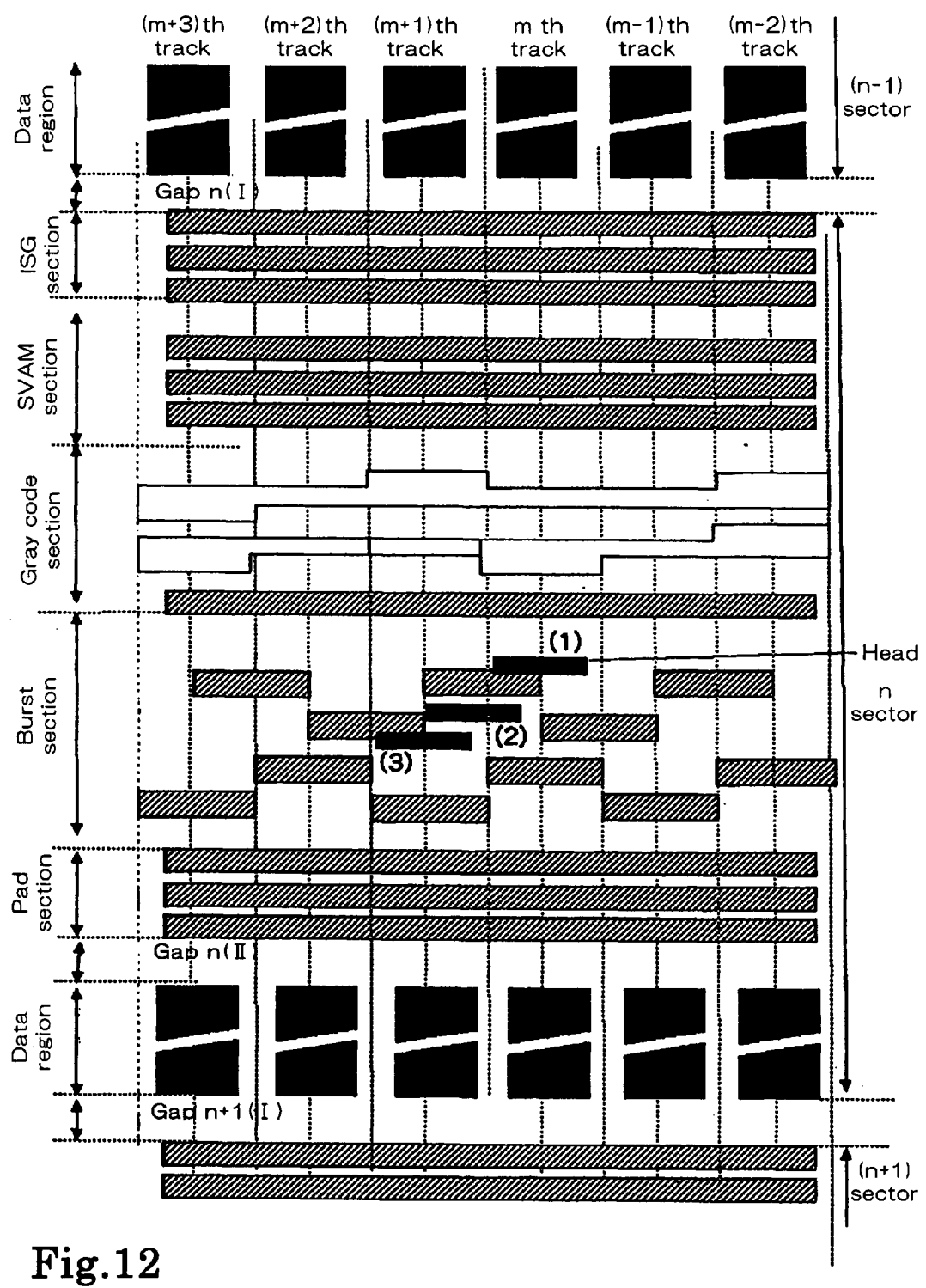
FIG. 12 illustrates a servo region centered at track m and sector n in a schematic diagram.
Figure 13:
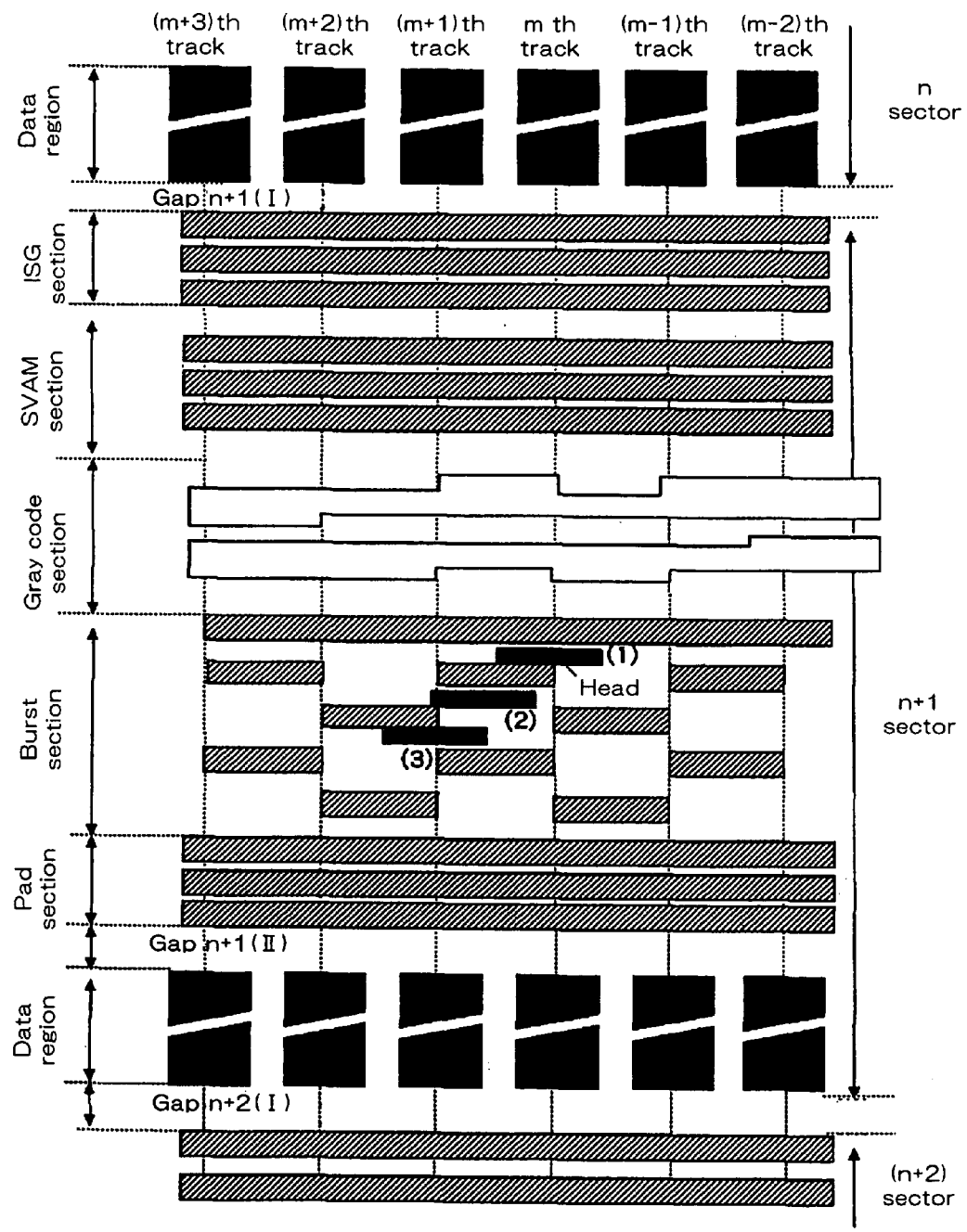
FIG. 13 illustrates a servo region centered at track m and sector n+1 in a schematic diagram.

Referring to FIG. 11, a flow chart illustrates a procedure of the re-magnetization at step 812 or 912 in greater detail. Step 812 or 912 corresponds to steps 1001–1006 in FIG. 11. Referring to FIG. 12, a servo region centered at track m and sector n is illustrated in a schematic diagram. Referring to FIG. 13, a servo region centered at track m and sector n+1 is illustrated in a schematic diagram.

When the re-magnetization process begins at step 812 or 912, it is impossible to use the servo signal of the sector which is being re-magnetized. Therefore, tracking servo control is started at a sector which precedes the re-magnetized sector, and read/write magnetic head 5 is kept in the same position while the servo region is being re-magnetized.

Referring to FIGS. 11 and 12, at step 1001, a tracking servo control is started at the (n−1)-th sector on the m-th track. Next, at step 1002, read/write magnetic head 5 is moved to the n-th sector on the m-th track. After gap n(I) of the m-th track, which follows the data region in the (n−1)-th sector on the m-th track is detected, the servo region is re-magnetized at step 1003 by read/write magnetic head 5 which is represented by (1).

Next, at step 1004, gap n(II) in the n-th sector on the m-th track, which follows the servo region of the n-th sector, is detected, and at step 1005, the write current to read/write magnetic head 5 is shut off to stop the re-magnetization. Then, at step 1006, magnetic recording medium 1 is rotated by one turn until read/write magnetic head 5 is positioned at the n-th sector of the m-th track.

Next, the servo region in the (n+1)-th sector on the m-th track is re-magnetized in a similar manner at steps 1007–1012. Read/write magnetic head 5 is represented by (1) of FIG. 13. Subsequently, the servo regions in all the other sectors on the m-th track are re-magnetized in a similar manner.

The gap can be detected by the following manner. A medium has, in general, data regions and servo regions in fixed lengths. Therefore, in the first method, the gap can be detected by calculating, in advance, the time required for a read/write magnetic head to pass across the data region and the servo region, and by counting the number of clocks corresponding to that time. For example, the gap n(I) of the n-th sector on the m-th track is detected by counting the number of clocks corresponding to the time required for the read/write magnetic head to pass across the data region in the (n−1)-th sector on the m-th track. Similarly, the gap n(II) of the n-th sector on the m-th track is detected by counting the number of clocks corresponding to the time required for the read/write magnetic head to pass across the servo region in the n-th sector on the m-th track.

In the second method, the gap can be detected by recording signals that indicate the existence of a gap at locations in the data regions, wherein the locations are adjacent to a servo region, and by reading the signals by the read/write magnetic head. For example, the gap n(I) of the n-th sector on the m-th track is detected by reading a signal which indicates the end of the data region and the beginning of the servo region. The signal is recorded, in advance, at a location in the data region in the (n−1)-th sector on the m-th track, the location of which is adjacent to the servo region in the n-th sector on the m-th track. Similarly, the gap n(II) of the n-th sector on the m-th track is detected by reading a signal which indicates the end of the servo region and the beginning of the data region by the read/write magnetic head, after the read/write magnetic head has passed across the servo region in the n-th sector on the m-th track. The signal is recorded, in advance, at a location in the data region in the n-th sector on the m-th track, which location is adjacent to the servo region in the n-th sector on the m-th track.

After the servo regions have been re-magnetized in all the sectors on the m-th track, the servo regions are re-magnetized in all the sectors on the (m+1)-th track. See (3) of FIG. 12 and FIG. 13. The process is repeated for the other tracks. This process, however, may be performed beginning with tracks having larger track number and moving to tracks having smaller track numbers.

In general, a read/write magnetic head has a track width that is smaller than a track pitch, and the servo control is not performed during the re-magnetization process, as mentioned above. Therefore, when servo regions are re-magnetized once per each track in the manner mentioned above, some regions may fail to be re-magnetized. To cope with this problem, each servo region is preferably re-magnetized twice by every half track pitch. Since the read/write magnetic head has a track width approximately 70% as wide as the track pitch, if the servo regions are re-magnetized in this way, re-magnetized portions overlaps with each other, even if the read/write magnetic head slightly deviates from the track due to the lack of servo control. This eliminates the possibility that the servo regions fail to be re-magnetized. If, because of the relationship between the track width of the read/write magnetic head and the track pitch, some servo regions fail to be re-magnetized when the read/write magnetic head is moved by every half track pitch, the read/write magnetic head may be moved by an amount smaller than one half of the track pitch, for example, every one-third track pitch, to re-magnetize the servo regions.

Figure 14:
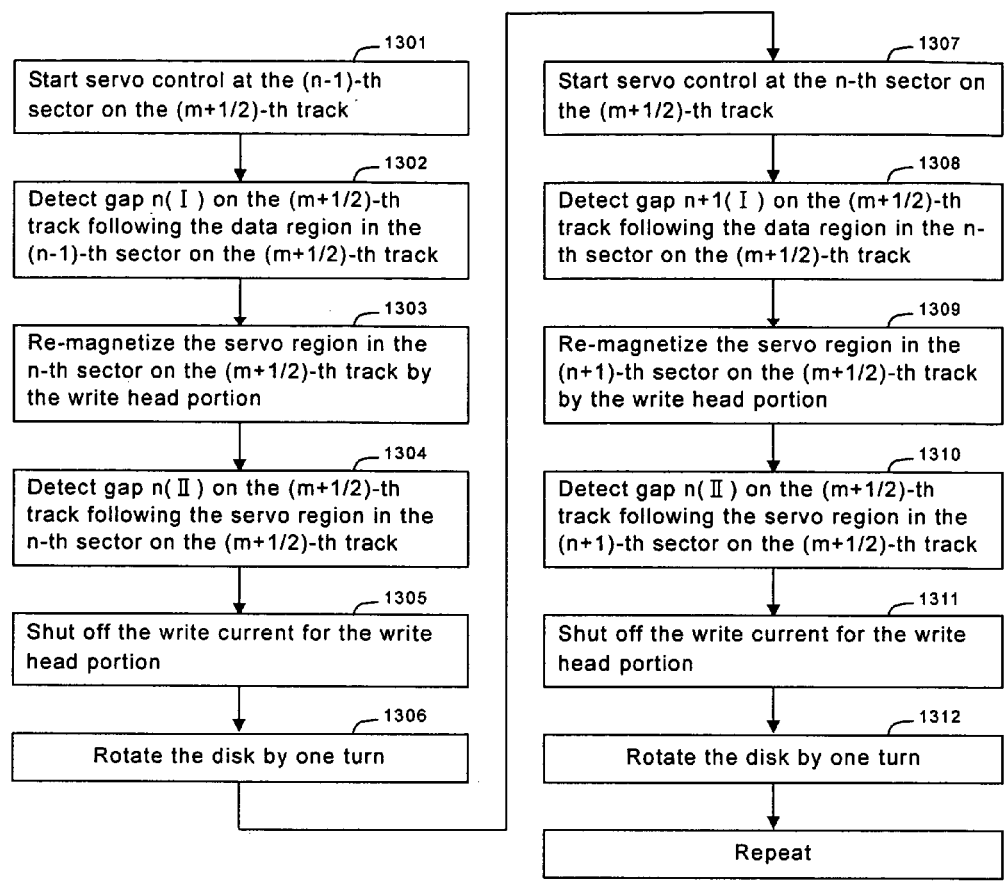
FIG. 14 illustrates a flow chart illustrating a procedure of the re-magnetization at step 812 or 912, when servo regions are re-magnetized by every half track pitch, in greater detail.

Referring to FIG. 14, a flow chart illustrates a procedure of the re-magnetization at step 812 or 912, when servo regions are re-magnetized by every half track pitch, in greater detail. Specifically, FIG. 14 illustrates a procedure of the re-magnetization of the servo regions on the (m+1/2)-th track, which is an intermediate track location between the m-th track and the (m+1)-th track, located one-half track pitch closer to the (m+1)-th track from the m-th track position. The read/write magnetic head is positioned at (2) in FIGS. 12 and 13. Steps 1301–1312 in FIG. 14 correspond to steps 1001–1012 in FIG. 11, respectively.

On completion of the re-magnetization of the servo regions in all the sectors on the (m+1/2)-th track, servo regions are sequentially re-magnetized in the sectors on the (m+1)-th track, (the read/write magnetic head is at position (3) in FIG. 12 or 13), the (m+3/2)-th track, the (m+2)-th track, the (m+5/2)-th track, the (m+3)-th track, the (m+7/2)-th track, the (m+4)-th track, etc., until all the servo regions in all the tracks are finally re-magnetized. The re-magnetization may be started from the track with the larger track number.

Figure 15:
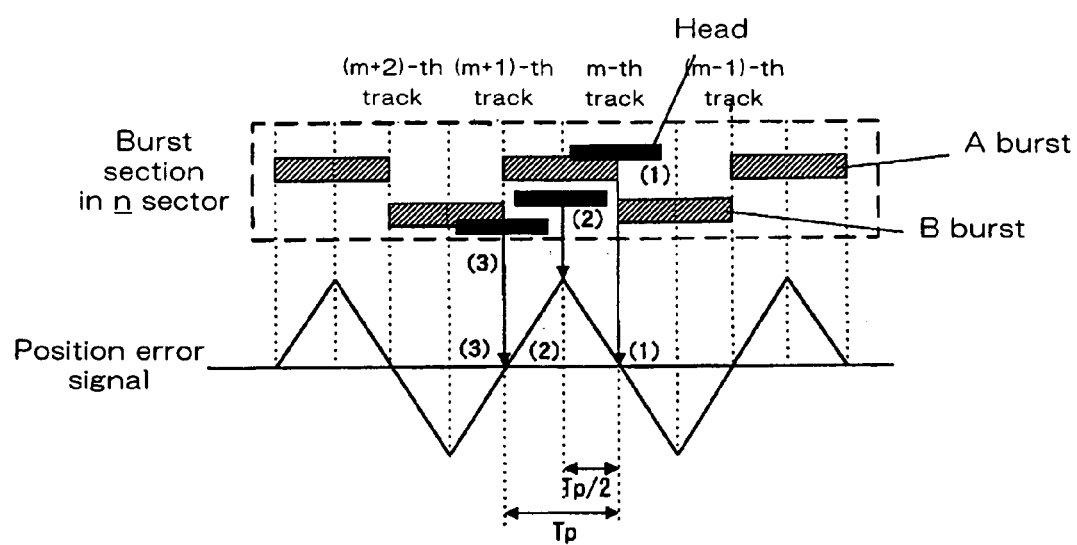
FIG. 15 illustrates a method for positioning the read/write magnetic head at an intermediate position between tracks in a diagram.

Referring to FIG. 15, a method is illustrated in a diagram for positioning the read/write magnetic head at an intermediate position between tracks, for example, at the (m+1/2)-th track.

As described above, the burst section in the servo region is composed of A to D bursts, and the A burst and the B burst are arranged symmetrically with respect to the center line of a track. The read/write magnetic head reads the servo signals recorded in the A burst and the B burst in the burst section for the purpose of tracking. Then, a position error signal is generated, which is a differential signal of the servo signals recorded in the A burst and B burst. This signal equals zero when the read/write magnetic head is positioned at the center line of the track, which is shown as position (1) or (3) in FIG. 15. The signal takes a maximum or a minimum value when the read/write magnetic head is positioned between the two tracks, which is shown as position (2) in FIG. 15. The read/write magnetic head can be positioned at an intermediate position between two tracks, by reading the servo signals which are recorded in the burst section by the read/write magnetic head, and by generating the position error signal based on these servo signals.

Figure 16:
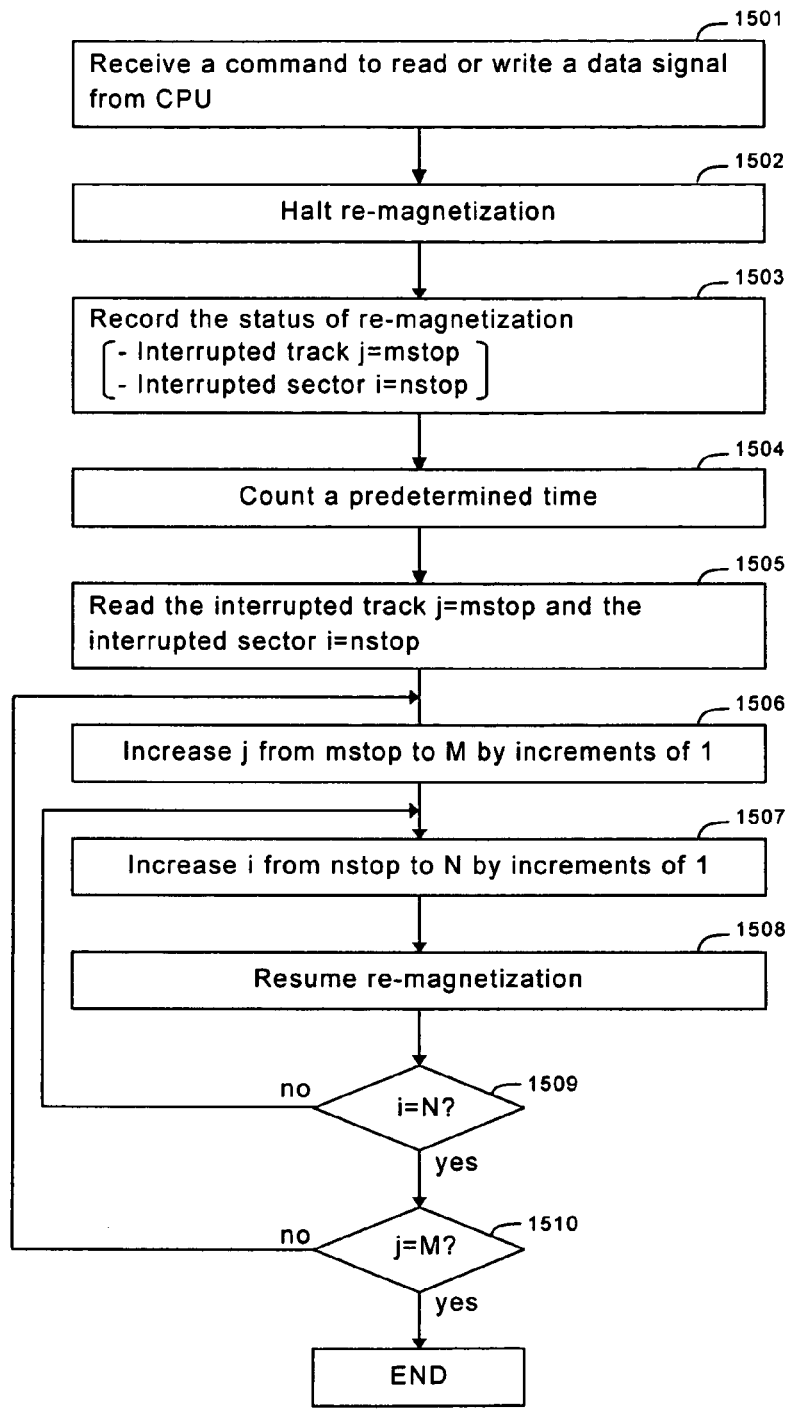
FIG. 16 illustrates a flow chart illustrating a procedure of the re-magnetization, when the CPU issues a command to record or reproduce data signals during the re-magnetization process of a servo region.

Referring to FIG. 16, a flow chart illustrates the procedure for re-magnetization when the CPU issues a command to record or reproduce data signals during the re-magnetization process of a servo region. When the CPU issues a command to record or reproduce data signals, the re-magnetization process is halted, because higher priority should be given to recording or reproducing the data signals. The re-magnetization process resumes after the data signals has been recorded or reproduced.

When a command is received from the CPU to record or reproduce data signals at step 1501, a magnetization current for the read/write magnetic head is shut off at step 1502 to halt the re-magnetization. The status of the re-magnetization at this stage is saved in non-volatile memory 112. Information to be saved includes track number j=mstop and sector number i=nstop when the re-magnetization is halted. When a predetermined time has passed since the completion of the recording or reproducing, the re-magnetization resumes at step 1504. The predetermined time may be determined as desired, such as when no command has been received to access the medium for a certain period, or when a certain time has passed since the medium was last operated. Next, at step 1505, track number j=mstop and sector number i=nstop saved at step 1503 are read, and the re-magnetization resumes from this servo region at step 1508. The foregoing steps are repeated until j=M and i=N at steps 1506, 1507, 1509, and 1510.

When the re-magnetization is completed, the date when the re-magnetization was performed, and the reproduced outputs that correspond to the sector addresses of the servo regions are recorded. The date is used to determine when the re-magnetization should be performed next. The output values are used as the initial values of reproduced outputs of the regions in the next re-magnetization process. The measured reproduced outputs are compared with these values.

Although a certain preferred embodiment of the present invention has been shown and described in detail, it should be understood that various changes and modifications may be made without departing from the spirit or scope of the appended claims.

What is claimed is:

1. A method for re-magnetizing a servo region of a perpendicular magnetic recording medium in a discrete track disk type in a magnetic storage device which is provided with a magnetic head, in order to prevent reduction in a reproduced output of a servo signal recorded in the servo region, wherein the magnetic head has a write head portion to record a data signal and a read head portion to read the data signal, the method comprising:

a first step of measuring a first amount which is indicative of a magnitude of magnetization in the servo region, by the read head portion; and a second step of re-magnetizing at least one of the servo regions as a target servo region by the write head portion, when a degraded servo region is detected in which a ratio of the first amount measured at the first step to an initial value of the first amount is smaller than a predetermined ratio, wherein the target servo region is detected by counting a number of clocks corresponding to a time required for the magnetic head to move across a data region preceding the target servo region.

2. The method according to claim 1, wherein the second step includes the steps of:

starting a servo control to position the magnetic head at a fixed position in a track width direction, when the magnetic head is positioned at a preceding servo region which precedes and is adjacent to the target servo region;

rotating the medium to move the magnetic head to the target servo region;

applying a magnetic field to the target region by the write head portion when a first gap is detected, wherein the first gap is located at a leading end of the target servo region in a rotating direction of the medium and defines a boundary between the target servo region and a preceding data region; and stopping applying the magnetic field, when a second gap is detected, wherein the second gap is located at a trailing end of the target servo region in the rotating direction of the medium and defines a boundary between the target servo region and a following data region.

3. The method according to claim 1, wherein the target servo region is the degraded servo region which is detected at the first step.

4. The method according to claim 1, wherein the target servo region includes all the servo regions in the medium.

5. The method according to claim 4, wherein the second step is performed for all the servo regions on one track, further comprising the steps of:

moving the magnetic head to an adjacent track; and performing the second step for all the servo regions on the adjacent track.

6. The method according to claim 4, wherein the second step is performed for all the servo regions on a track, further comprising the steps of:

moving the magnetic head in a track width direction by a predetermined distance less than a track width; and performing the second step again for all the servo regions on the track.

7. A method for re-magnetizing a servo region of a perpendicular magnetic recording medium in a discrete track disk type in a magnetic storage device which is provided with a magnetic head, in order to prevent reduction in a reproduced output of a servo signal recorded in the servo region, wherein the magnetic head has a write head portion to record a data signal and a read head portion to read the data signal, the method comprising:

a first step of measuring a first amount which is indicative of a magnitude of magnetization in the servo region, by the read head portion; and a second step of re-magnetizing at least one of the servo regions as a target servo region by the write head portion, when a degraded servo region is detected in which a ratio of the first amount measured at the first step to an initial value of the first amount is smaller than a predetermined ratio, wherein the second step includes the steps of:

starting a servo control to position the magnetic head at a fixed position in a track width direction, when the magnetic head is positioned at a preceding servo region which precedes and is adjacent to the target servo region;

rotating the medium to move the magnetic head to the target servo region;

applying a magnetic field to the target region by the write head portion when a first gap is detected, wherein the first gap is located at a leading end of the target servo region in a rotating direction of the medium and defines a boundary between the target servo region and a preceding data region; and stopping applying the magnetic field, when a second gap is detected, wherein the second gap is located at a trailing end of the target servo region in the rotating direction of the medium and defines a boundary between the target servo region and a following data region, wherein the first and second gaps are detected by counting a number of clocks corresponding to a time required for the magnetic head to move across the data region and the servo region, respectively.

8. A method for re-magnetizing a servo region of a perpendicular magnetic recording medium in a discrete track disk type in a magnetic storage device which is provided with a magnetic head, in order to prevent reduction in a reproduced output of a servo signal recorded in the servo region, wherein the magnetic head has a write head portion to record a data signal and a read head portion to read the data signal, the method comprising:

a first step of measuring a first amount which is indicative of a magnitude of magnetization in the servo region, by the read head portion; and a second step of re-magnetizing at least one of the servo regions as a target servo region by the write head portion, when a degraded servo region is detected in which a ratio of the first amount measured at the first step to an initial value of the first amount is smaller than a predetermined ratio, wherein the second step includes the steps of:

starting a servo control to position the magnetic head at a fixed position in a track width direction, when the magnetic head is positioned at a preceding servo region which precedes and is adjacent to the target servo region;

rotating the medium to move the magnetic head to the target servo region;

applying a magnetic field to the target region by the write head portion when a first gap is detected, wherein the first gap is located at a leading end of the target servo region in a rotating direction of the medium and defines a boundary between the target servo region and a preceding data region; and stopping applying the magnetic field, when a second gap is detected, wherein the second gap is located at a trailing end of the target servo region in the rotating direction of the medium and defines a boundary between the target servo region and a following data region, wherein the first and second gaps are detected by reading signals indicative of existence of the gap by the read head portion, wherein each signal is recorded at a location adjacent to the servo region in the preceding and in the following data regions, respectively.

9. A method for re-magnetizing a servo region of a perpendicular magnetic recording medium in a discrete track disk type in a magnetic storage device which is provided with a magnetic head, in order to prevent reduction in a reproduced output of a servo signal recorded in the servo region, wherein the magnetic head has a write head portion to record a data signal and a read head portion to read the data signal, the method comprising:

a first step of measuring a first amount which is indicative of a magnitude of magnetization in the servo region, by the read head portion;

a second step of re-magnetizing at least one of the servo regions as a target servo region by the write head portion, when a degraded servo region is detected in which a ratio of the first amount measured at the first step to an initial value of the first amount is smaller than a predetermined ratio; and a third step of measuring the first amount after the second step was performed, wherein the measured first amount will be used for the initial value thereafter.

10. The method according to claim 1, further comprising:

a fourth step of saving a date and a time when the re-magnetization was performed, for each servo region, wherein the first step and the second step are performed again after a predetermined time has passed since the time of the date.

11. The method according to claim 1, wherein the predetermined ratio is in a range of 0.85 to 0.95.

12. The method according to claim 1, wherein the first amount is the reproduced output of the servo region.

13. The method according to claim 1, wherein the first amount is an inverse of a gain used in an automatic gain control.

14. The method according to claim 1, wherein the first step and the second step are performed when no command is received from a central processing unit in a host to read or write the data signal.

15. A method for re-magnetizing a servo region of a perpendicular magnetic recording medium in a discrete track disk type in a magnetic storage device which is provided with a magnetic head, in order to prevent reduction in a reproduced output of a servo signal recorded in the servo region, wherein the magnetic head has a write head portion to record a data signal and a read head portion to read the data signal, the method comprising:

(a) measuring a first amount which is indicative of a magnitude of magnetization in the servo region, by the read head portion;

(b) re-magnetizing at least one of the servo regions as a target servo region by the write head portion, when a degraded servo region is detected in which a ratio of the first amount measured at the step (a) to an initial value of the first amount is smaller than a predetermined ratio;

(c) halting the step (b) when a command is received from a central processing unit in a host to read or write the data signal during the step (b), and saving a track number and a sector number of the servo region which was being re-magnetized when the command was received; and (d) reading the track number and the sector number saved at the step (c) when a predetermined time has passed since the command was received, and resuming the step (b) from the servo region which has the read sector number and the read track number.

16. A read only memory in which a program is recorded to operate a computer to perform the method according to claim 1.

17. A magnetic storage device comprising:
   the perpendicular magnetic recording medium in the discrete track disk type;
   the magnetic head; and
   a central processing unit to read the program from the read only memory according to claim 16, and to perform the first step and the second step by the write head portion and the read head portion, thereby preventing reduction in the reproduced output of the servo signal recorded in the servo region of the perpendicular magnetic recording medium.

18. A method for re-magnetizing a servo region of a magnetic recording medium which is provided with a magnetic head having a write head portion to record a data signal and a read head portion to read the data signal, the method comprising:
   applying a magnetic field to a target servo region by the write head portion when a first gap is detected, wherein the first gap is located at a leading end of the target servo region in a rotating direction of the medium and defines a boundary between the target servo region and a preceding data region; and
   stopping applying the magnetic field, when a second gap is detected, wherein the second gap is located at a trailing end of the target servo region in the rotating direction of the medium and defines a boundary between the target servo region and a following data region,
   wherein the first and second gaps are detected by counting a number of clocks corresponding to a time required for the magnetic head to move across the data region and the servo region, respectively.

19. A method for re-magnetizing a servo region of a magnetic recording medium which is provided with a magnetic head having a write head portion to record a data signal and a read head portion to read the data signal, the method comprising:
   applying a magnetic field to a target servo region by the write head portion when a first gap is detected, wherein the first gap is located at a leading end of the target servo region in a rotating direction of the medium and defines a boundary between the target servo region and a preceding data region; and
   stopping applying the magnetic field, when a second gap is detected, wherein the second gap is located at a trailing end of the target servo region in the rotating direction of the medium and defines a boundary between the target servo region and a following data region,
   wherein the first and second gaps are detected by reading signals indicative of existence of the gap by the read head portion, wherein each signal is recorded at a location adjacent to the servo region in the preceding and in the following data regions, respectively.

20. A method for re-magnetizing a servo region of a magnetic recording medium which is provided with a magnetic head, wherein the magnetic head has a write head portion to record a data signal and a read head portion to read the data signal, the method comprising:
   a first step of measuring a first amount which is indicative of a magnitude of magnetization in the servo region, by the read head portion;
   a second step of re-magnetizing at least one of the servo regions as a target servo region by the write head portion, when a degraded servo region is detected in which a ratio of the first amount measured at the first step to an initial value of the first amount is smaller than a predetermined ratio; and
   a third step of measuring the first amount after the second step was performed, wherein the measured first amount will be used for the initial value thereafter.

21. A method for re-magnetizing a servo region of a magnetic recording medium which is provided with a magnetic head, wherein the magnetic head has a write head portion to record a data signal and a read head portion to read the data signal, the method comprising:
   (a) measuring a first amount which is indicative of a magnitude of magnetization in the servo region, by the read head portion;
   (b) re-magnetizing at least one of the servo regions as a target servo region by the write head portion, when a degraded servo region is detected in which a ratio of the first amount measured at the step (a) to an initial value of the first amount is smaller than a predetermined ratio; and
   (c) halting the step (b) when a command is received from a central processing unit in a host to read or write the data signal during the step (b), and saving a track number and a sector number of the servo region which was being re-magnetized when the command was received.

22. The method of claim 21 further comprising:
   (d) reading the track number and the sector number saved at the step (c) when a predetermined time has passed since the command was received, and resuming the step (b) from the servo region which has the read sector number and the read track number.

* * * * *